United States Patent
Saame et al.

(10) Patent No.: US 7,040,466 B2
(45) Date of Patent: May 9, 2006

(54) BRAKE DISC

(75) Inventors: Christoph Saame, Gaimersheim (DE);
Johann Bauer, Ingolstadt (DE);
Kamjar Yazdirad, Ingolstadt (DE)

(73) Assignee: Audi AG, (DE)

( * ) Notice: Subject to any disclaimer, the term of this patent is extended or adjusted under 35 U.S.C. 154(b) by 0 days.

(21) Appl. No.: 10/483,955

(22) PCT Filed: Jun. 7, 2002

(86) PCT No.: PCT/EP02/06241

§ 371 (c)(1),
(2), (4) Date: Jan. 16, 2004

(87) PCT Pub. No.: WO03/019032

PCT Pub. Date: Mar. 6, 2003

(65) Prior Publication Data

US 2004/0173418 A1    Sep. 9, 2004

(30) Foreign Application Priority Data

Aug. 31, 2001 (DE) ................................. 101 42 806

(51) Int. Cl.
*B60T 1/06* (2006.01)
(52) U.S. Cl. ............................. 188/218 XL; 188/18 A; 188/250 D
(58) Field of Classification Search ......... 188/218 XL, 188/73.32, 18 A, 250 D, 250 R, 250 C, 264 A
See application file for complete search history.

(56) References Cited

U.S. PATENT DOCUMENTS

| | | | | |
|---|---|---|---|---|
| 3,994,370 A | * | 11/1976 | Gebhardt et al. | 188/218 XL |
| 4,180,286 A | * | 12/1979 | Ginter, Jr. | 285/328 |
| 4,280,598 A | * | 7/1981 | Pollinger | 188/218 XL |
| 4,429,770 A | * | 2/1984 | Weisbrod | 188/73.32 |
| 4,613,021 A | * | 9/1986 | Lacombe et al. | 188/218 XL |
| 4,747,473 A | * | 5/1988 | Bok et al. | 188/73.2 |
| 6,116,386 A | * | 9/2000 | Martin | 188/218 XL |
| 6,446,765 B1 | * | 9/2002 | Dabertrand et al. | 188/18 A |
| 6,557,672 B1 | * | 5/2003 | Wirth | 188/218 XL |

FOREIGN PATENT DOCUMENTS

| | | |
|---|---|---|
| DE | 1132950 | 9/1959 |
| DE | 1164761 | 3/1961 |
| DE | 1922803 | 9/1965 |
| DE | 3315122 A1 | 10/1983 |
| DE | 3902657 A1 | 8/1990 |
| DE | 19842982 A1 | 4/2000 |
| DE | 10000915 A1 | 7/2001 |
| EP | 1091137 A1 | 4/2001 |

* cited by examiner

*Primary Examiner*—Melanie Torres
(74) *Attorney, Agent, or Firm*—Stevens, Davis, Miller & Mosher, LLP

(57) ABSTRACT

The invention relates to a brake disc for a disc brake, in particular in motor vehicles. Said brake disc comprises a friction ring (12) and a pot-shaped supporting part (14), the friction ring consisting of several ring segments (18), which adjoin one another in a circumferential direction. To provide a construction that can be commercially produced in a cost-effective manner and that is not prone to warping, the ring segments are provided with semi-circular recesses (18a), which encompass retaining bolts (16) that extend radially. The retaining bolts are fixed in circumferential sections of the supporting part and support the ring segments by means of a positive fit in a centrifugal direction. The retaining bolts are preferably configured in a tubular manner.

18 Claims, 3 Drawing Sheets

BRAKE DISC

The invention relates to a brake disc for disc brakes, especially in motor vehicles, as outlined in this specification and the appended claims.

BACKGROUND OF THE INVENTION

Such a brake disc is disclosed for example in DE 33 15 122 A1. Here the brake disc is composed of several ring segments each of which overlap one another in the frontal contact area and are joined to one another by means of a retaining bolt.

The object of the invention is to develop the generic brake disc such that it is easier to produce and it is lighter especially in the frontal contact area of the ring segments and thus is less sensitive to temperature.

SUMMARY OF THE INVENTION

This object is achieved as claimed for the invention with the characterizing features of the claims.

It is proposed as claimed in the invention that each ring segment in the frontal contact area encloses the retaining bolts to the extent of one half in the radial direction, that the retaining bolts are mounted in the circumferential sections of the supporting part, and that the retaining bolts provide positive-locking support for the ring segments in the centrifugal direction. Especially when the retaining bolts are made tubular does there result a light and still durable construction which moreover outstandingly equalizes temperature differences and the associated thermal stresses.

The retaining bolts can be held in a manner which is simple in terms of production engineering by locking means which act by providing positive-locking support, especially when using interposed springs in the form of short helical compression springs or plate springs temperature-induced material stresses being especially favorably equalized and warping of the brake disc being reliably avoidable even under high temperature loads.

For internally ventilated brake discs, as a result of the configuration as claimed in the invention, there is a structurally displaced frontal contact area of the ring segments, by which a larger number of cooling channels can be realized, moreover as a result of the tubular configuration of the retaining bolts their likewise forming a cooling channel. In conjunction with an annular ventilation gap which is located between the circumferential sections of the supporting part and the ring segments of the friction ring the cooling of the brake disc is outstanding, with uniform temperature dissipation.

Especially for steel retaining bolts it can be advantageous to provide them with a coating to prevent corrosion or for optimization of friction. A coating for example of $Zr_2O_5$ can be applied in a PVD or CVD process especially advantageously. These coatings are especially resistant to temperature and wear.

In a brake disc with a friction ring with an outside diameter of at least 250 mm, based on the proposed construction there can be at least eight ring segments which can be made as identical parts in a manner favorable to production engineering, which ensure durable construction with reliable stress equalization and which moreover form water drainage grooves as a result of the radial alignment of the frontal contact areas.

BRIEF DESCRIPTION OF THE DRAWINGS

One embodiment of the invention is detailed below and is described in conjunction with several drawings, in which.

DETAILED DESCRIPTION OF THE INVENTION

Figure 1:
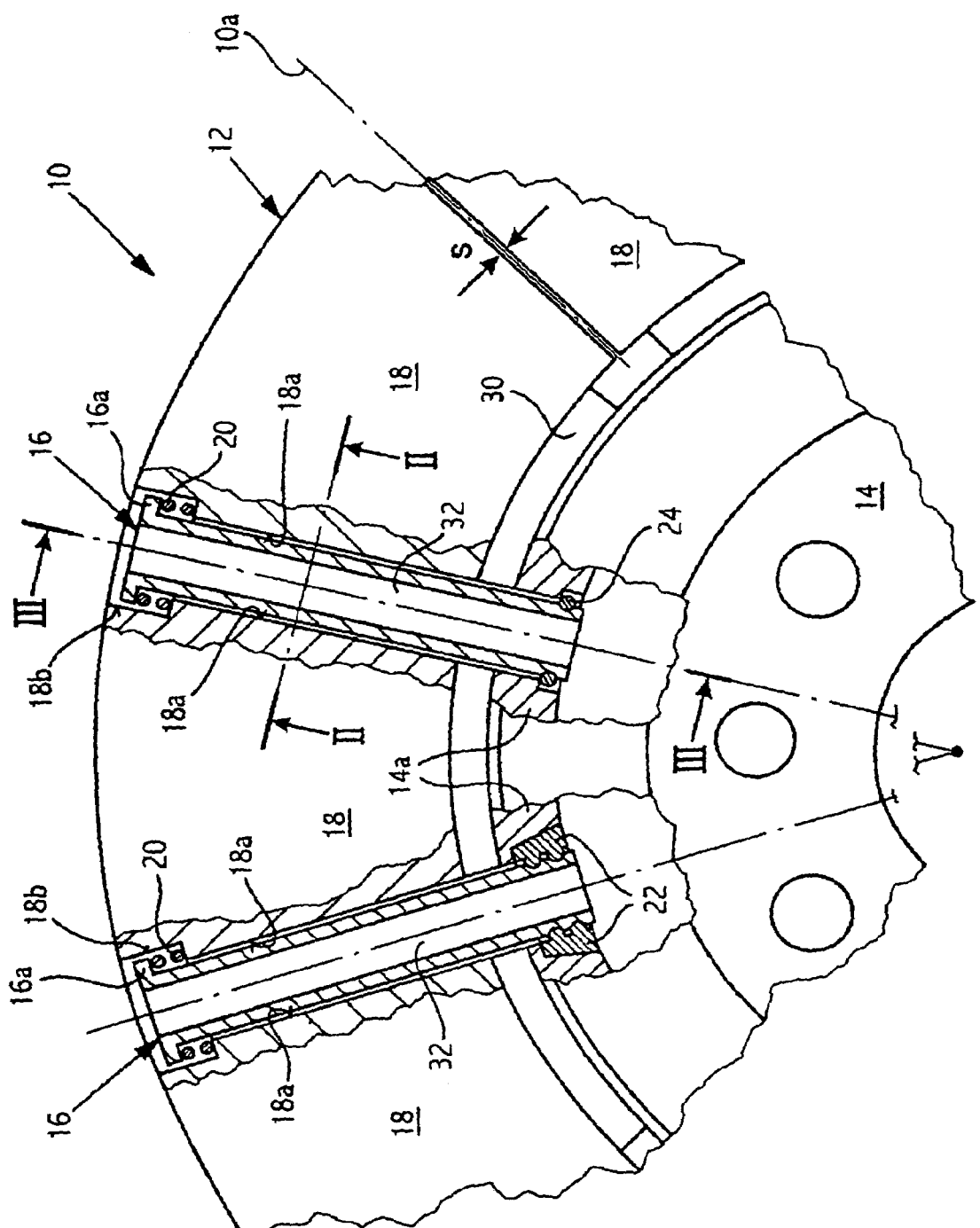
FIG. 1 schematically shows a section of the brake disc for a disc brake for motor vehicles with a representation of the retaining bolts which is cutaway in the frontal contact area of the ring segments.

The rotationally symmetrical brake disc 10, which is shown only in sections for a disc brake in motor vehicles, is composed essentially of the friction ring 12 of cast steel or ceramic, a cup-shaped supporting part 14 of deep-drawable steel and several tubular retaining bolts 16, likewise of steel, which connect the friction ring 12 to the supporting part 14.

The friction ring 12 consists of several ring segments 18, in the embodiment for an outside diameter of the brake disc 10 of approximately 300 mm, of twelve ring segments 18.

Each ring segment 18 on its bilateral frontal contact areas (dividing lines 10a of FIG. 1) has semicircular recesses 18a extending in the radial direction which enclose the respective retaining bolts 16 around almost half their outside circumference. At the frontal contact areas 10a on the two friction sides of the friction disc 12 there remain radially extending gaps s which preclude direct contact of the ring segments 18 among one another and simultaneously form water or brake wear discharge grooves.

The recesses 18a are widened in the radially outer section 18b for holding one short helical compression spring 20 and one ring shoulder-shaped head section 16a of the retaining bolts 16 respectively.

Furthermore the retaining bolts 16 are attached by providing positive-locking support in the circumferential sections 14a of the supporting part 14 radially to the inside by way of locking means. The locking means can be semicircular wedges 22 or elastic steel rings 24 which provide positive-locking support in the corresponding groove-shaped or conical depressions of the retaining bolts 16 and the circumferential sections 14a, as is apparent on the drawings.

The connection by the retaining bolts 16 is held radially under pretensioning by the temperature-resistant (and corrosion-resistant) helical compression springs 20 (or by the corresponding plate springs); nevertheless the ring segments 18 with strong temperature changes on the friction ring 12 with minor compression of the helical compression springs 20 can move radially to the outside and thus reduce material stresses. Warping or distortion of the brake disc 10 is thus for the most part avoided.

Figure 2:
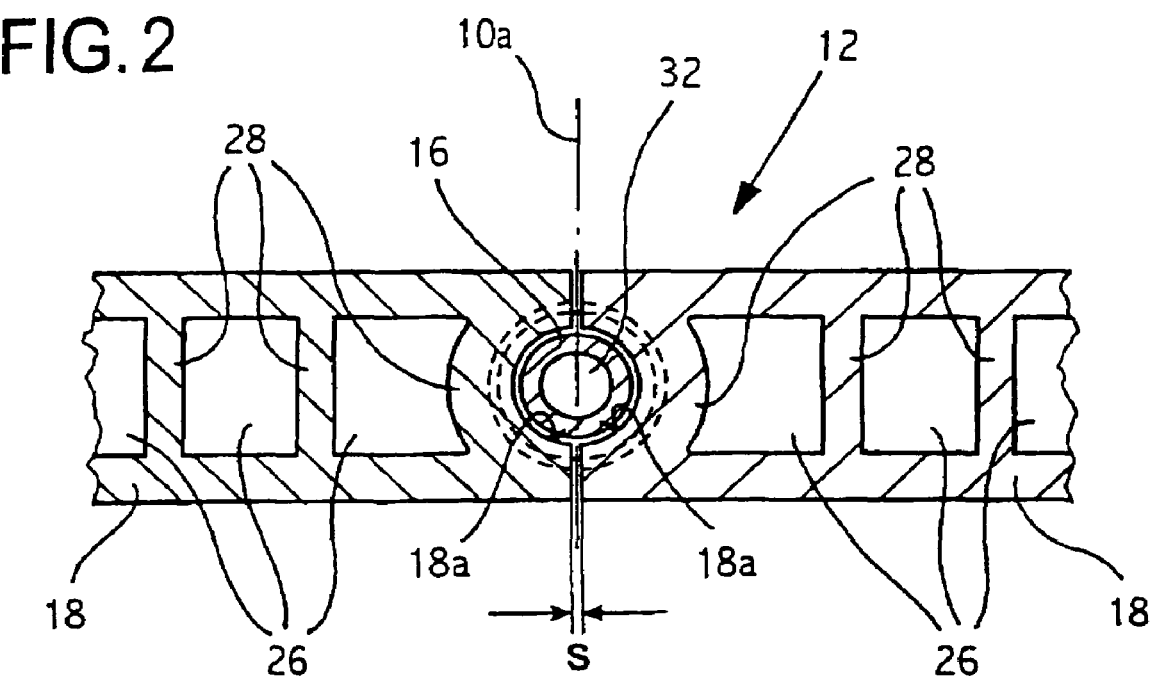
FIG. 2 shows a section along line II—II of FIG. 1 through the frontal contact area of two ring segments.
Figure 3:
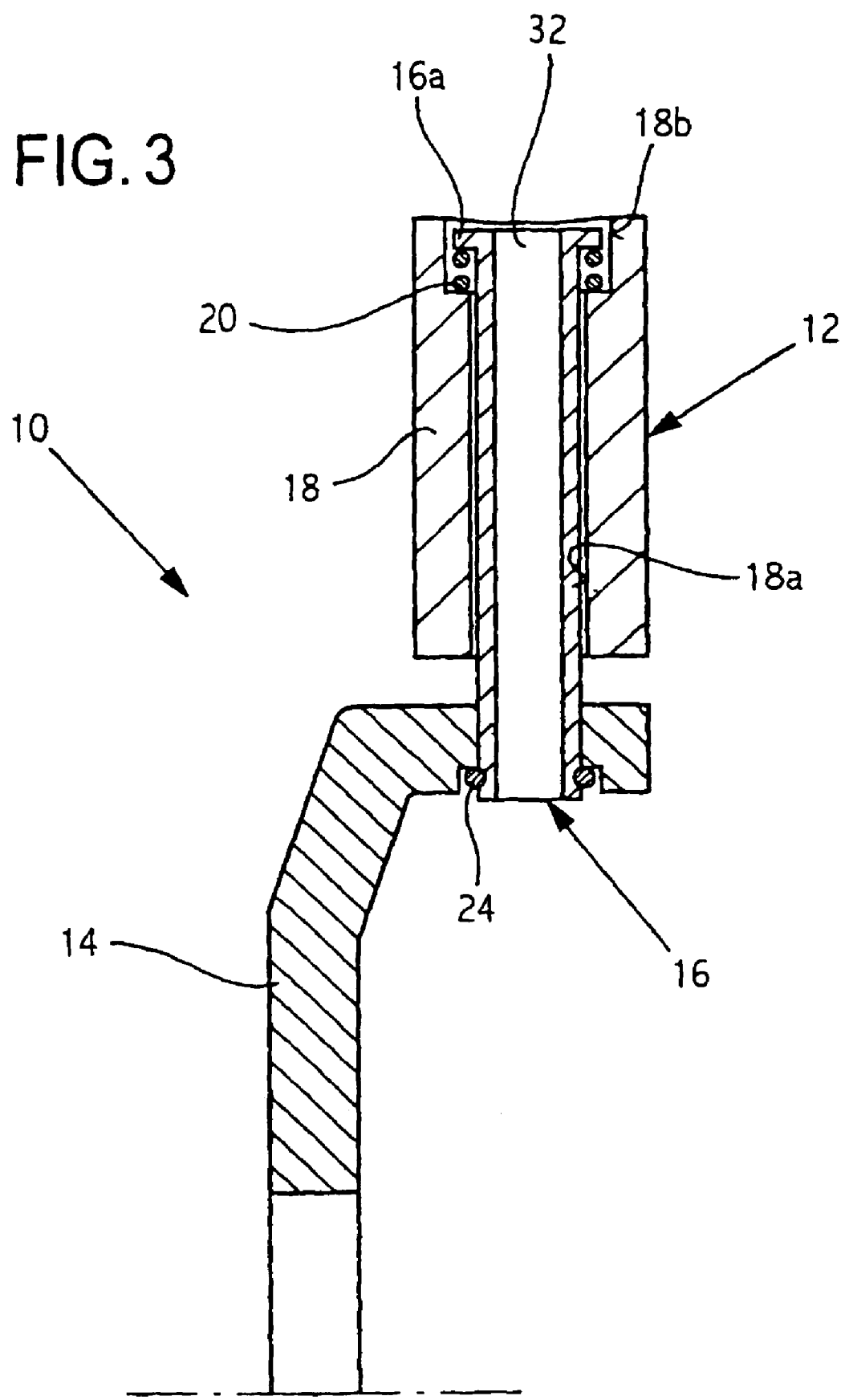
FIG. 3 shows another section along line III—III of FIG. 1 along one frontal contact area in the middle axis of the retaining bolt.

In the ring segments 18 (cf. FIG. 2) several radially extending cooling channels 26 with connecting bridges 28 located in between are formed in each. The cooling channels 26 discharge radially to the inside into an annular ventilation gap 30 which is formed between the circumferential sections 14a of the supporting part 14 or between its outside circumference and the ring segments or their inside periphery.

Other cooling channels 32 are formed by the tubular retaining bolts 16 which discharge radially to the inside into the cup-shaped supporting part 14 with bridging of the ventilation gap 30.

To optimize the friction conditions and to prevent corrosion the retaining bolts 16 are provided at least on their contact surfaces to the ring segments 18 with a PVD coating (physical vapor deposition) of $Zr_2O_5$.

The invention claimed is:

1. A disc for a disc brake mountable on a support member, comprising:
    at least two circumferentially spaced segments;
    means disposed between successive ones of said segments for fastening each of said successive segments to said support member; and
    yieldable biasing means disposed between said fastening means and said successive ones of said segments;
    wherein said segments are yieldably displaceable relative to said fastening means.

2. A disc according to claim 1 wherein said fastening means is provided with an opening therethrough disposed radially relative to an axis of said segments.

3. A disc according to claim 1 wherein each of said segments is provided with an opening therethrough disposed radially relative to an axis of said segments.

4. A disc according to claim 1 wherein said segments are spaced radially from said support member relative to an axis of said segments.

5. A disc according to claim 1 including a spring allowing the yieldable displacement of said segments relative to said fastening means.

6. A disc according to claim 5 wherein said spring is a coil spring.

7. A disc according to claim 1 wherein said fastening means are provided with a protective coating.

8. A disc according to claim 7 wherein said coating comprises a PVD coating of $Zr_2O_5$.

9. A disc according to claim 1 wherein including at least eight of said segments.

10. A disc according to claim 1 wherein an outer diameter of a ring formed by said segments mounted on said support means is at least 250 mm.

11. A disc according to claim 1 wherein opposed faces of each successive ones of said segments include recesses which receive portions of said fastening means.

12. A disc according to claim 1 wherein each of said fastening means comprises a retaining bolt.

13. A disc according to claim 12 wherein said bolt is tubular.

14. A disc according to claim 12 wherein said bolt includes an end portion attachable to said support member, successive ones of said segments are received between said head portion and said support member when said disc is mounted on said support member.

15. A disc according to claim 14 wherein said yieldable means comprises a spring.

16. A disc according to claim 12 wherein opposing faces of each successive set of segments are provided with recess which receives portions of said bolt therein when said disc is mounted on said support means.

17. A disc according to claim 12 wherein said segments are radially spaced from said support member relative to an axis of said disc when said segments are mounted on said support means.

18. A disc according to claim 12 wherein said segments are provided with openings therethrough.

* * * * *